(12) United States Patent
Fricke et al.

(10) Patent No.: US 8,115,808 B2
(45) Date of Patent: Feb. 14, 2012

(54) COORDINATE MEASURING MACHINE AND METHOD FOR CALIBRATING THE COORDINATE MEASURING MACHINE

(75) Inventors: Wolfgang Fricke, Netphen (DE); Klaus Rinn, Heuchelheim (DE); Slawomir Czerkas, Weilburg (DE)

(73) Assignee: Vistec Semiconductor Systems GmbH, Weilburg (DE)

( * ) Notice: Subject to any disclaimer, the term of this patent is extended or adjusted under 35 U.S.C. 154(b) by 903 days.

(21) Appl. No.: 12/215,115

(22) Filed: Jun. 25, 2008

(65) Prior Publication Data
US 2009/0002486 A1    Jan. 1, 2009

(30) Foreign Application Priority Data
Jun. 29, 2007 (DE) .................. 10 2007 030 390

(51) Int. Cl.
*H04N 7/18* (2006.01)

(52) U.S. Cl. ................. 348/95; 348/94; 348/86; 348/87

(58) Field of Classification Search ............ 355/53, 355/67; 33/503; 345/102, 173; 348/95, 348/94, 86, 87
See application file for complete search history.

(56) References Cited

U.S. PATENT DOCUMENTS

| | | | |
|---|---|---|---|
| 4,583,298 A | 4/1986 | Raugh | 33/502 |
| 4,871,290 A | 10/1989 | Kaczynski et al. | 414/331 |
| 6,317,991 B1 | 11/2001 | Rinn | 33/1 M |
| 6,920,249 B2 | 7/2005 | Rinn et al. | 382/199 |
| 2004/0061687 A1* | 4/2004 | Kent et al. | 345/173 |
| 2004/0178997 A1* | 9/2004 | Gillespie et al. | 345/173 |
| 2005/0088636 A1* | 4/2005 | Kurosawa | 355/53 |
| 2007/0252966 A1* | 11/2007 | Shirata | 355/67 |
| 2008/0201971 A1* | 8/2008 | Heiden et al. | 33/503 |
| 2009/0033612 A1* | 2/2009 | Roberts et al. | 345/102 |

FOREIGN PATENT DOCUMENTS

| | | |
|---|---|---|
| DE | 37 16 549 | 12/1988 |
| DE | 197 34 695 | 11/1998 |
| DE | 100 47 211 | 8/2002 |
| DE | 20 2005 000 351 | 6/2005 |

OTHER PUBLICATIONS

Carola Blaesing:"Pattern Placement Metrology for Mask Making," presented by Dr. Carola Bläsing at the Semicon meeting, Education Program in Geneva, Switzerland on Mar. 31, 1998, 11 pages.

* cited by examiner

*Primary Examiner* — Le Luu
(74) *Attorney, Agent, or Firm* — Davidson, Davidson & Kappel, LLC

(57) ABSTRACT

A coordinate measuring machine is disclosed having an orientor automatically orienting a substrate associated therewith. A control and computing unit is further associated with the coordinate measuring machine, so that self-calibration may be performed on the basis of at least two different and automatically set orientations of the substrate.

12 Claims, 5 Drawing Sheets

COORDINATE MEASURING MACHINE AND METHOD FOR CALIBRATING THE COORDINATE MEASURING MACHINE

This claims the benefit of German Application No. DE 10 2007 030 390.6 filed on Jun. 29, 2007 and hereby incorporated by reference herein.

The present invention relates to a coordinate measuring machine.

The invention further relates to a method for calibrating the coordinate measuring machine.

BACKGROUND

A coordinate measuring device is sufficiently well-known from prior art. See, for example, the lecture script "Pattern Placement Metrology for Mask Making" by Dr. Carola Bläsing. The lecture was given on the occasion of the Semicon conference, Education Program, in Geneva on Mar. 31, 1998, wherein the coordinate measuring machine was described in detail. The structure of a coordinate measuring machine as known, for example, from prior art will be explained in more detail in the following description associated with FIG. 1. A method and a measuring device for determining the position of structures on a substrate is known from German published application DE 10047211 A1. For details regarding the mentioned position determination see that document.

SUMMARY OF THE INVENTION

It is an object of the present invention to provide a coordinate measuring machine with which automatic self-calibration may be performed.

The present invention provides a coordinate measuring including: a means for automatically orienting a substrate wherein the means is associated with the coordinate measuring machine; a control and computing unit for performing a self-calibration, based on at least two different and automatically set orientations of the substrate; a measurement table movable in a X-coordinate direction and a Y-coordinate direction, on which the automatically oriented substrate is deposited; an illumination means for illuminating the substrate, wherein the illumination means includes an incident light arrangement and/or a transmitted light arrangement; and a camera having at least one measurement window for measuring a at least one edge of a structure on a substrate.

It is a further alternate or additional object of the invention to provide a method with which self-calibration of the coordinate measuring machine may be performed.

The present invention also provides a method including the steps of: measuring at least one edge of a structure on the substrate in a first orientation of the substrate, automatically setting a second orientation with a means for orienting, measuring the at least one edge of the structure on the substrate in the second orientation at the same location as in the first measurement, and using the data sets obtained from the differing orientations of the structure for the calibration of the coordinate measuring machine.

It is particularly advantageous if a means for automatically orienting the substrate is associated with the coordinate measuring machine. A control and computing unit is further associated with the coordinate measuring machine, so that self-calibration may be performed based on at least two different and automatically set orientations of the substrate.

There is provided a transfer station having a robot associated therewith which delivers the substrate to the means for orienting. After the orientation, the robot removes the substrate from the means for orienting and inserts the newly oriented substrate into the coordinate measuring machine.

There is provided a measurement table movable in the X-coordinate direction and in the Y-coordinate direction, on which the automatically newly-oriented substrate is deposited. There is further provided a camera having at least one measurement window for measuring the structure. There is also provided an illumination means for illuminating the substrate. The illumination means includes an incident light arrangement and/or a transmitted light arrangement. The circumstances of the measurement are decisive for the choice whether the substrate is illuminated with incident light and/or with transmitted light.

It may be advantageous if the coordinate measuring machine, the means for orienting, the illumination means, the camera, a magazine and at least one transport means are arranged in a common climatic chamber. In addition, it is also advantageous if the means for orienting is arranged in an air flow of the climatic chamber. The advantage consists in the fact that particles or dust that may adhere to the substrate may be blown away in the air flow.

The means for orienting may be associated with an illumination means having a camera associated therewith which captures an image of the substrate on which the orientation may be determined. The camera includes an evaluation unit for an identification of the substrate. The identification is applied to a free part of the surface of the substrate. It is also contemplated that an extra capturing unit for the identification of the substrate may be associated with the means for orienting.

The means for orienting may have a computer associated therewith with the help of which the user may set a predetermined orientation of the substrate. The computer may also be used for image evaluation to evaluate the images of the substrate acquired by the camera and determine the orientation of the substrate based on the evaluation. The computer may also be used to execute a predefined recipe and set given orientations of the substrate.

The inventive method for calibrating the coordinate measuring machine is characterized by the following steps. Initially at least one structure on the substrate is measured in a first orientation of the substrate. Then a second orientation is automatically set by the means for orienting. The substrate is measured in a second orientation, wherein the at least one structure is measured at the same location as in the first measurement. Data sets are obtained from the differing orientations of the substrate, the data sets being used for the calibration of the coordinate measuring machine. It is advantageous if the data sets for the calibration of the coordinate measuring machine are automatically used for calculation. The data sets may also be stored in a computer. An output may indicate that the result of the calibration is within a predetermined tolerance range.

The calibration may be performed automatically by the coordinate measuring machine in defined time intervals. It is also contemplated that the calibration is performed upon user request. A variety of operating instructions may be made available to the user, which may be combined in any desired way for execution in order to achieve the calibration of the coordinate measuring machine.

BRIEF DESCRIPTION OF THE DRAWINGS

In the following, embodiments will explain the invention and its advantages in more detail with reference to the accompanying figures.

DETAILED DESCRIPTION

Figure 1:
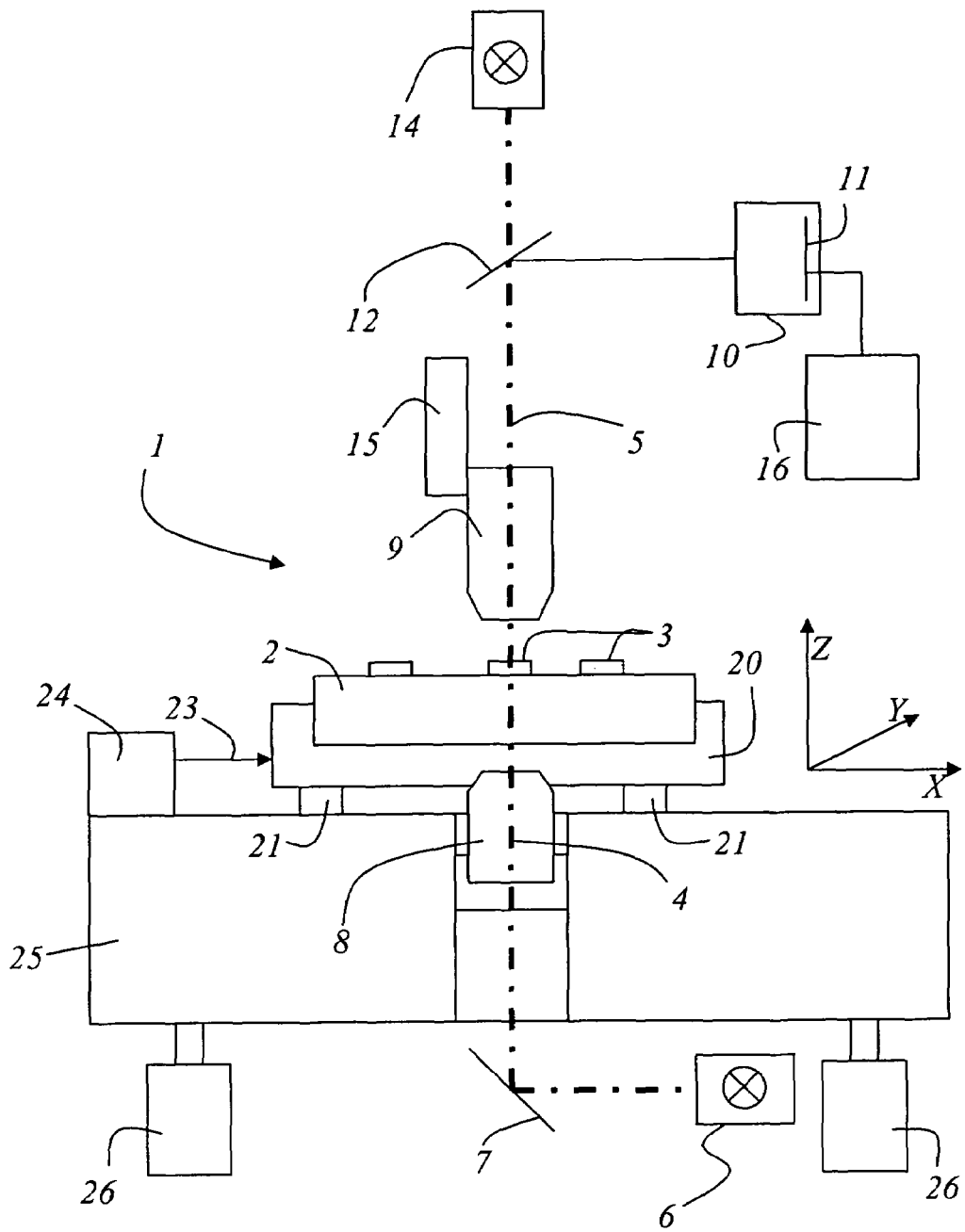
FIG. 1 schematically shows a prior art coordinate measuring device.

A coordinate measuring device of the type shown in FIG. 1 has already been described in detail in prior art and is thus known in detail from prior art. The coordinate measuring device 1 includes a measurement table 20 movable in the X-coordinate direction and in the Y-coordinate direction. The measurement table 20 carries a substrate or a mask for semiconductor production. Several structures 3 are applied to a surface of the substrate 2. The measurement table itself is supported by air bearings 21 which are, in turn, supported by a granite block 25. At least one incident light illumination means 14 and/or one transmitted light illumination means 6 are provided for the illumination of the substrate 2. In the embodiment shown, the light of the transmitted light illumination means 6 is launched into the illumination axis 4 for the transmitted light by means of a deflecting mirror 7. The light of the illumination means 6 reaches the substrate 2 via a condenser 8. The light of the incident light illumination means 14 reaches the substrate 2 through the measurement objective 9. The light coming from the substrate 2 is collected by the measurement objective 9 and is coupled out of the optical axis 5 by a semi-transparent mirror 12. This measurement light reaches a camera 10 provided with a detector 11. A computing unit 16 is associated with the detector 11, with which digital images may be generated from the acquired data.

The position of the measurement table 20 is measured and determined by means of a laser interferometer 24. For this purpose, the laser interferometer 24 emits a measurement light beam 23. The measurement microscope 9 is also connected to a displacing means in the Z-coordinate direction, so that the measurement objective 9 may be focused on the surface of the substrate 2. The position of the measurement objective 9 may be measured, for example, with the help of a glass scale (not shown). The granite block 25 is further positioned on slabs 26 with an anti-vibration arrangement. All potential building vibrations and natural vibrations of the coordinate measuring device are to be maximally reduced or eliminated by this vibration damping.

Figure 2:
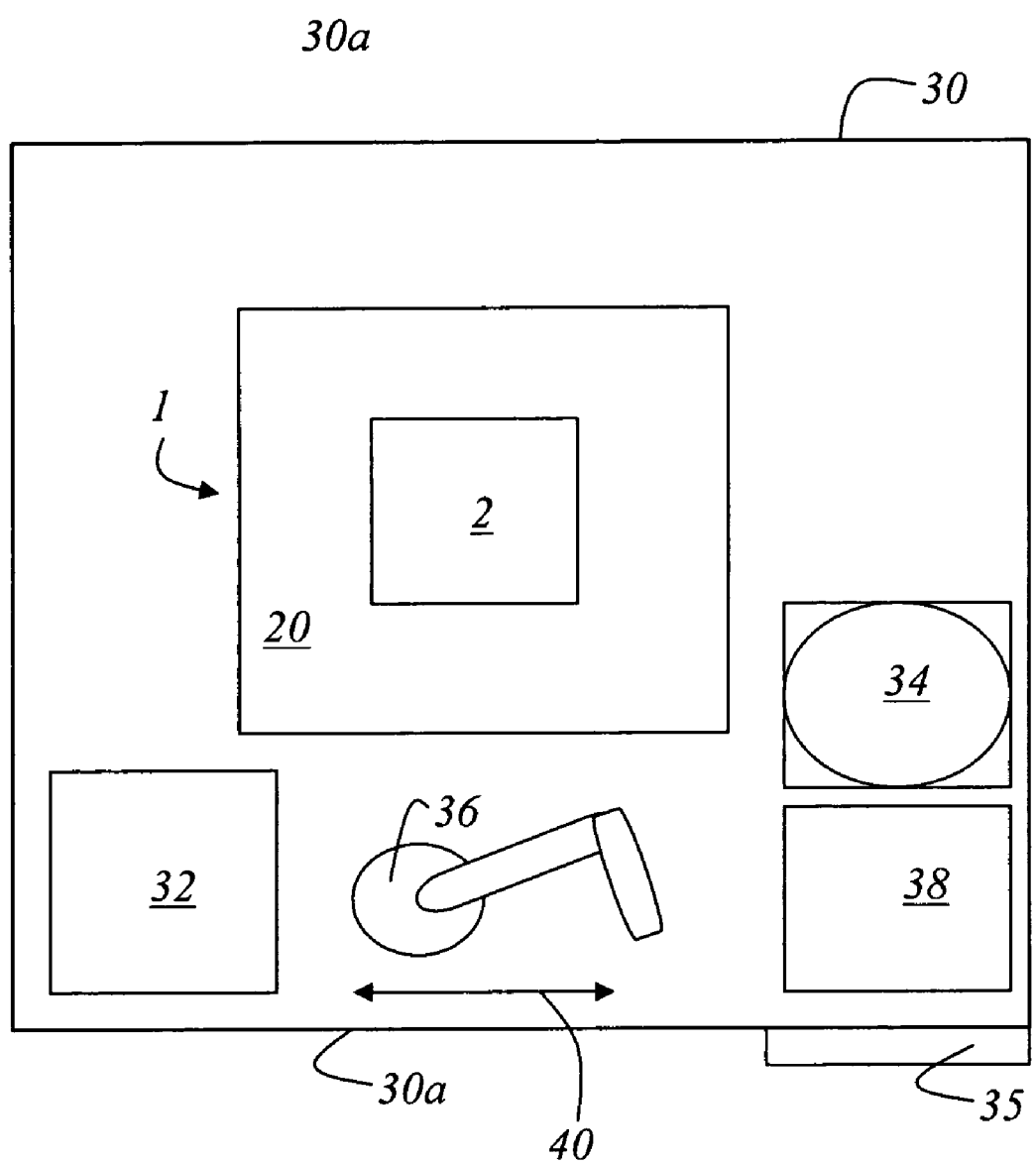
FIG. 2 shows a schematic representation of the device for measuring coordinates of structures on a substrate, wherein all required elements and means are arranged within a climatic chamber.

FIG. 2 shows a schematic view of the arrangement of the coordinate measuring device 1 and further means associated with the coordinate measuring device 1 to guarantee an efficient inspection or measurement of the substrates 2. In the embodiment shown in FIG. 2, the coordinate measuring device 1 is shown in simplified form. In FIG. 2, the coordinate measuring device 1 is shown only with the measurement table 20 and the substrate 2 located on the measurement table 20. Together with other means, the coordinate measuring means 1 is located in a climatic chamber 30. In the embodiment shown, a magazine 32 for storing substrates 2 or masks within the climatic chamber 30 is associated with the coordinate measuring means 1. Means for orienting 34 the substrates is also arranged within the climatic chamber. A transfer station 35 is provided in a wall 30a of the climatic chamber 30. A transport robot 36 and further transport means 38 may further be provided within the climatic chamber 30. Although a magazine 32 for storing substrates 2 and/or for temperature adaptation of substrates 2 is provided, someone skilled in the art will understand that the magazine within the climatic chamber 30 may be omitted. The robot 36 may move within the climatic chamber along the direction indicated by the double arrow 40. The substrates 2 may be transferred into the climatic chamber via the transfer aperture 35. The transport means 38 represents a transfer station. The robot 36 removes the substrate 2 from the transfer station 38 and, depending on the recipe, deposits it on the means 35 for orienting, on the measurement table 20 or in the magazine 32.

Figure 3:
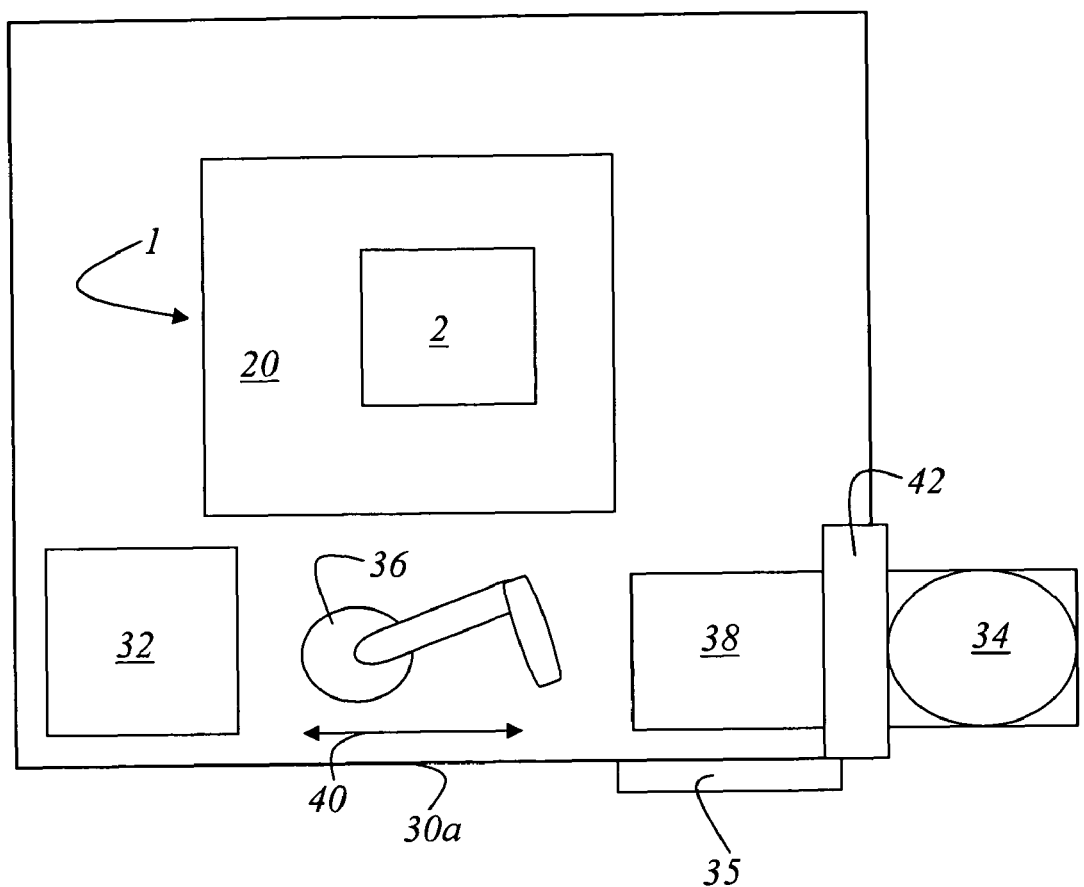
FIG. 3 schematically shows another embodiment of the invention, wherein the means for orienting the substrates is arranged outside the climatic chamber.

FIG. 3 shows another embodiment of the arrangement connected to a coordinate measuring machine 1. Equal elements are referred to by equal reference numerals. In the embodiment shown in FIG. 3, the means 34 for orienting is arranged outside the climatic chamber 30. The means 34 for orienting is connected to the climatic chamber by means of an interface 42, so that the oriented substrates may be delivered to the coordinate measuring machine 1 via the interface 42.

Figure 4:
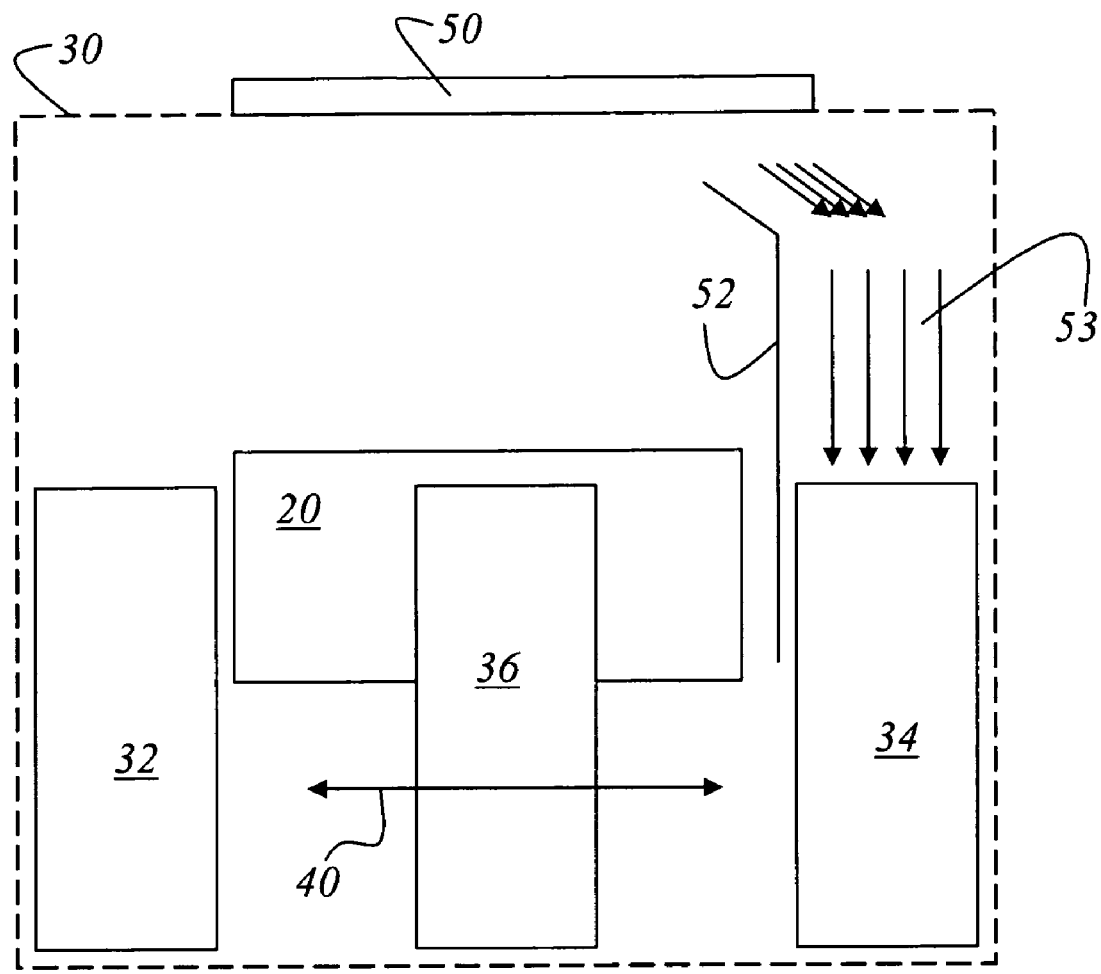
FIG. 4 shows a schematic front view of the coordinate measuring machine and the means associated with the coordinate measuring machine, wherein at least one means is arranged in an air flow within the climatic chamber.

FIG. 4 shows a side view of the arrangement of the various means in the climatic chamber 30 of a coordinate measuring means. The climatic chamber 30 is connected to a ventilator means 50 blowing air of a predetermined clean room degree into the climatic chamber 30. An air guiding plate 52 may be provided in the climatic chamber 30, with which an air flow 53 may be generated which is correspondingly directed to the means 34 for orienting the substrates. The air flow may have the advantage that any particles adhering to the substrate 2 may be blown away.

Figure 5:
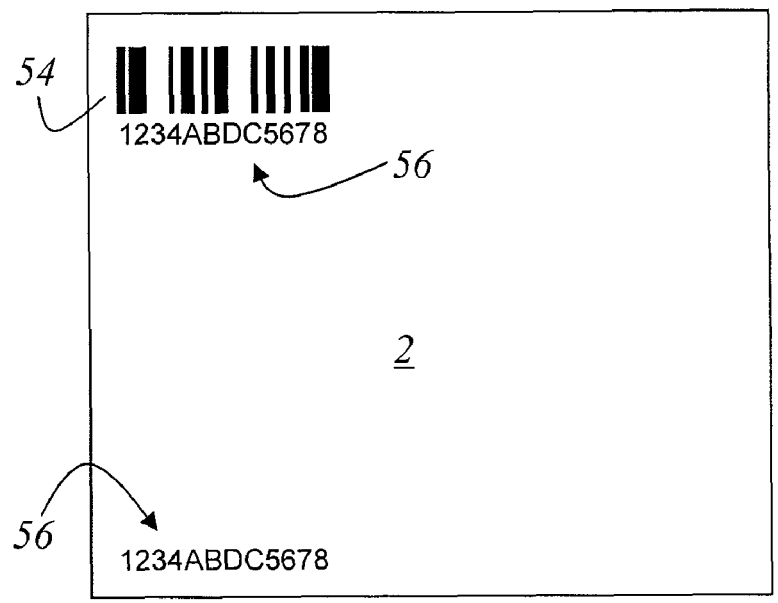
FIG. 5 shows a substrate provided with at least one marking for the substrate.

FIG. 5 shows a schematic representation of a substrate 2. The substrate 2 is provided with several markings 54 and 56. The first marking 54 may be a bar code. The second marking 56 may be an alphanumeric marking of the substrate 2. Based on the markings 54 and 56, it is possible to determine the orientation of the substrate 2.

Figure 6:
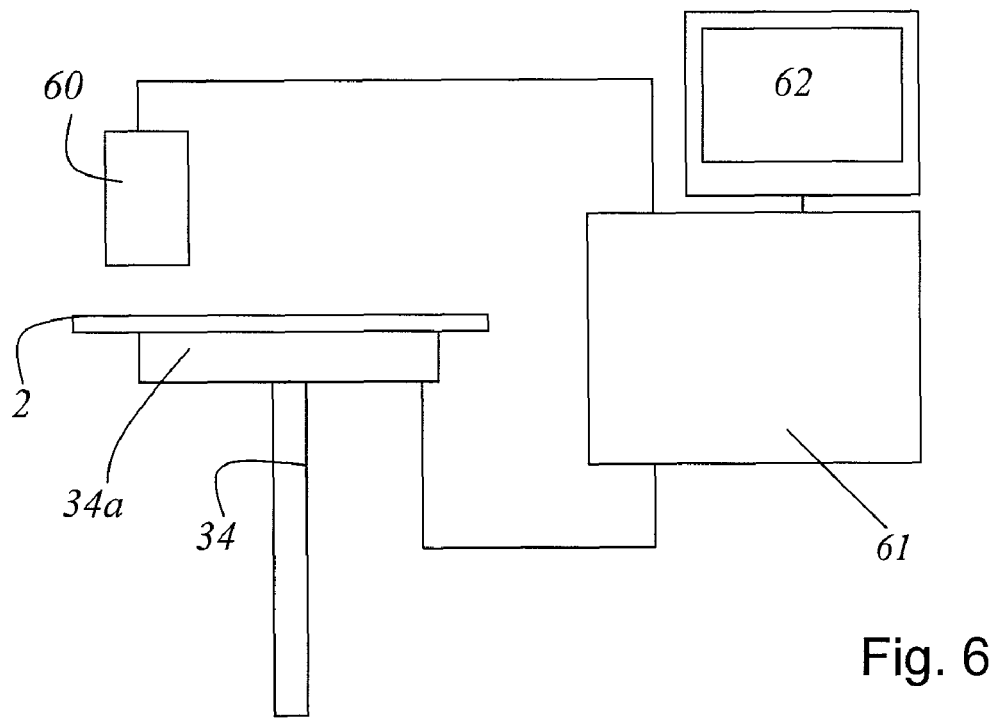
FIG. 6 shows a schematic arrangement of a camera in operating connection with a means for orienting the substrate.

FIG. 6 shows a schematic arrangement of a detection means 60 for the orientation of the substrate 2. The substrate 2 is deposited on the means 34 for orienting the substrate 2. The means 34 for orienting the substrate 2 includes a rotary plate 34a carrying the substrate 2. The means 34 for orienting the substrate 2 is connected to a computing unit 61 with which the orientation of the substrate may be set automatically. Opposite the substrate 2, a camera 60 is provided with which images of the part of the substrate bearing the markings 54 and 56 may be acquired. It is also contemplated that the whole surface of the substrate 2 may be captured by the camera 60. The orientation of the substrate may then be determined from the image of the surface of the substrate 2 by means of image processing in the computer 61. On a display 62, the current and/or newly set orientation of the substrate 2 may be displayed to the user. It is also contemplated that the user may input data with respect to the orientation of the substrate via the display 62. A creation of recipes with which predetermined calibration steps may be performed may also be input by means of the display and thus be conveyed to the computer 61.

For calibrating the coordinate measuring machine 1, it is necessary to measure at least one structure 3 on the substrate 2 in a first orientation of the substrate 2. A second orientation is set by the means 34 for orienting the substrate. Then the substrate is measured in the second orientation of the at least one structure at the same location as in the first measurement. Data regarding the position and/or dimension of the structure 3 on the substrate are then obtained from the differing orientations. These data sets are used for calibrating the coordinate measuring machine. The data sets obtained from the measurement of the various orientations of the substrate may be automatically used for calculation for the calibration of the coordinate measuring machine 1. It is also contemplated that the data sets are stored in the computer 61 and used for later calibration or correction of the real measurement values. It is also contemplated that there is an output for the user on the display 62 if the result of the calibration is within a predetermined tolerance range. The calibration of the coordinate measuring machine may be performed automatically in defined time intervals. The calibration may also be performed upon user request. A variety of operating instructions may be made available to the user on the display 62, which may be combined in any desired way on the display 62 for execution.

Based on these freely combinable operating instructions, a calibration of the coordinate measuring machine 1 may be achieved.

The invention has been described with reference to particular embodiments. However, it is contemplated that modifications and changes may be made without departing from the scope of the following claims.

What is claimed is:

1. A coordinate measuring machine comprising:
   a means for automatically orienting a substrate wherein the means is associated with the coordinate measuring machine;
   a control and computing unit for performing a self-calibration, based on at least two different and automatically set orientations of the substrate;
   a measurement table movable in a X-coordinate direction and a Y-coordinate direction, on which the automatically oriented substrate is deposited;
   an illumination means for illuminating the substrate, wherein the illumination means includes an incident light arrangement and/or a transmitted light arrangement; and
   a camera having at least one measurement window for measuring at least one edge of a structure on a substrate;
   wherein a transfer station is provided and a robot is associated with the transfer station which delivers the substrate to the means for orienting and, after orientation, removes the substrate from the means for orienting and supplies it to the coordinate measuring machine in the newly set orientation.

2. The coordinate measuring machine of claim 1, wherein the coordinate measuring machine, the means for orienting, the illumination means, the camera, a magazine and at least one transport means are arranged in a common climatic chamber.

3. The coordinate measuring machine of claim 2, wherein the means for orienting is arranged in the air flow of the climatic chamber.

4. The coordinate measuring machine of claim 1, wherein the means for orienting has associated therewith the illumination means and the camera capturing an image of the substrate from which the orientation is determinable.

5. The coordinate measuring machine of claim 4, wherein the camera includes an evaluation unit for an identification of the substrate.

6. The coordinate measuring machine of claim 4, wherein an extra capturing unit for the identification of the substrate is associated with the means for orienting.

7. The coordinate measuring machine of claim 1, wherein the means for orienting has associated therewith a computer which sets an orientation of the substrate input by the user.

8. The coordinate measuring machine of claim 1, wherein the means for orienting has associated therewith a computer which sets a defined orientation of the substrate determined and given according to a predefined recipe.

9. A coordinate measuring machine comprising:
   an orientor automatically orienting a substrate and associated with the coordinate measuring machine;
   a control and computing unit performing a self-calibration, based on at least two different and automatically set orientations of the substrate;
   a measurement table movable in a X-coordinate direction and a Y-coordinate direction, on which the automatically oriented substrate is deposited;
   an illuminator illuminating the substrate and including an incident light arrangement and/or a transmitted light arrangement; and
   a camera having at least one measurement window for measuring at least one edge of a structure on a substrate;
   wherein a transfer station is provided and a robot is associated with the transfer station which delivers the substrate to the orientor and, after orientation, removes the substrate from the orientor and supplies it to the coordinate measuring machine in the newly set orientation.

10. The coordinate measuring machine of claim 9 wherein the orientor is a rotary plate.

11. A coordinate measuring machine comprising:
    a means for automatically orienting a substrate wherein the means is associated with the coordinate measuring machine;
    a control and computing unit for performing a self-calibration, based on at least two different and automatically set orientations of the substrate;
    a measurement table movable in a X-coordinate direction and a Y-coordinate direction, on which the automatically oriented substrate is deposited;
    an illumination means for illuminating the substrate, wherein the illumination means includes an incident light arrangement and/or a transmitted light arrangement; and
    a camera having at least one measurement window for measuring at least one edge of a structure on a substrate;
    wherein the means for orienting has associated therewith the illumination means and the camera capturing an image of the substrate from which the orientation is determinable;
    wherein the camera includes an evaluation unit for an identification of the substrate.

12. A coordinate measuring machine comprising:
    a means for automatically orienting a substrate wherein the means is associated with the coordinate measuring machine;
    a control and computing unit for performing a self-calibration, based on at least two different and automatically set orientations of the substrate;
    a measurement table movable in a X-coordinate direction and a Y-coordinate direction, on which the automatically oriented substrate is deposited;
    an illumination means for illuminating the substrate, wherein the illumination means includes an incident light arrangement and/or a transmitted light arrangement; and
    a camera having at least one measurement window for measuring at least one edge of a structure on a substrate;
    wherein the means for orienting has associated therewith the illumination means and the camera capturing an image of the substrate from which the orientation is determinable;
    wherein an extra capturing unit for the identification of the substrate is associated with the means for orienting.

* * * * *